United States Patent
Wong

(10) Patent No.: US 10,075,640 B2
(45) Date of Patent: Sep. 11, 2018

(54) MOTION COMPENSATION FOR IMAGE SENSOR WITH A BLOCK BASED ANALOG-TO-DIGITAL CONVERTER

(71) Applicant: Sony Corporation, Tokyo (JP)

(72) Inventor: Ping Wah Wong, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/985,601

(22) Filed: Dec. 31, 2015

(65) Prior Publication Data

US 2017/0195574 A1    Jul. 6, 2017

(51) Int. Cl.
| | |
|---|---|
| H04N 5/232 | (2006.01) |
| H04N 5/378 | (2011.01) |
| H04N 9/04 | (2006.01) |
| H04N 9/077 | (2006.01) |
| H04N 9/64 | (2006.01) |

(52) U.S. Cl.
CPC ....... *H04N 5/23267* (2013.01); *H04N 5/2329* (2013.01); *H04N 5/23258* (2013.01); *H04N 5/378* (2013.01); *H04N 9/045* (2013.01); *H04N 9/077* (2013.01); *H04N 9/646* (2013.01)

(58) Field of Classification Search
None
See application file for complete search history.

(56) References Cited

U.S. PATENT DOCUMENTS

| | | | |
|---|---|---|---|
| 2013/0176445 A1* | 7/2013 | Streeter | G01S 17/36 348/208.1 |
| 2013/0296049 A1* | 11/2013 | Jump | A63F 13/06 463/31 |
| 2014/0369417 A1* | 12/2014 | Shi | H04N 19/52 375/240.16 |
| 2015/0036944 A1* | 2/2015 | Restrepo | G06T 3/606 382/264 |
| 2015/0042841 A1* | 2/2015 | Tzur | H04N 5/23212 348/222.1 |
| 2015/0157931 A1* | 6/2015 | Adachi | G06F 3/017 463/31 |
| 2015/0161059 A1* | 6/2015 | Durham | G06F 12/1408 713/193 |
| 2015/0265220 A1* | 9/2015 | Ernst | A61B 6/527 600/411 |
| 2016/0117564 A1* | 4/2016 | Govil | G06K 9/605 382/103 |
| 2016/0212347 A1* | 7/2016 | Hara | H04N 5/23267 |
| 2016/0358334 A1* | 12/2016 | Osborne | G06T 7/0012 |
| 2016/0358629 A1* | 12/2016 | Pribula | H04N 21/43615 |
| 2017/0084044 A1* | 3/2017 | Keh | G06T 7/2006 |

\* cited by examiner

*Primary Examiner* — James Hannett
(74) *Attorney, Agent, or Firm* — Michael Best & Friedrich LLP

(57) ABSTRACT

An electronic device including a motion sensor and motion correction circuitry. The motion sensor detects motion of the electronic device and outputs motion information based on the detected motion. The motion correction circuitry corrects raw domain image data, received from an image sensor that has a block-based analog-to-digital converter architecture, based on the motion information. The corrected image data is output in a same raw domain image data format as the uncorrected raw domain image data.

29 Claims, 15 Drawing Sheets

| R | G1 | R | G1 |
|---|----|---|----|
| G2 | B | G2 | B |
| R | G1 | R | G1 |
| G2 | B | G2 | B |

FIG. 8

MOTION COMPENSATION FOR IMAGE SENSOR WITH A BLOCK BASED ANALOG-TO-DIGITAL CONVERTER

BACKGROUND

1. Field of the Invention

The present invention relates generally to image processing, and more particularly to motion compensation processing for an image sensor that has a block-based analog-to-digital converter architecture.

2. Description of the Related Art

Digital image capturing devices use image sensors to convert incident light energy into electrical signals. Image sensor designs include Charged Coupled Devices (CCD), Complementary Metal Oxide Silicon (CMOS) image sensors, and Digital Pixel System (DPS) sensors. An image sensor includes a two-dimensional array of light sensing elements called pixels. Each pixel in the array works with the lens system to respond to incident light within a local area of the scene, and produces an electrical signal describing the characteristics of the scene. The electrical signals that are output from the light sensing elements are converted to digital form, and the resulting digital pixel values form the raw data representing the scene. The raw data can be processed by an image processor to produce rendered digital images.

Image sensors can be designed to support either rolling shutter or global shutter exposure methods. The difference between rolling shutter and global shutter resides in the timing that the pixels in the array are reset and exposed to light. Specifically, rolling shutter refers to a method wherein the pixels in the sensor are reset and exposed to light one group at a time (e.g., one row at a time), thus resulting in a delay in reset and exposed time between consecutive groups. Global shutter refers to a method wherein all the pixels in the array are reset and exposed to light at substantially the same time. U.S. Pat. No. 8,953,075 titled "CMOS image sensors implementing full frame correlated double sampling with global shutter", the contents of which are incorporated herein by reference in their entirety, describes CMOS image sensor examples with global shutter and full frame correlated double sampling support.

The ability of an imaging device to resolve fine details is often referred to as the resolution of the imaging device. One measure of resolution includes an area resolution, which corresponds to the total number of pixels in the image sensor (or the number of pixels in the image sensor that contribute to an image, i.e. number of pixels per image frame). Another measure of resolution includes a pixel-density resolution, which corresponds to the number of pixels per predetermined area in the imaging device with a given lens focal length. For imaging application that utilize multiple images across time, such as capturing video, another measure of resolution includes time resolution, which may correspond to the number of captured image frames per second. The area resolution reflects the ability of the system to resolve details in the scene, whereas the time resolution reflects the ability of the system to resolve motions or changes in the scene.

As noted above, image sensors generally convert the analog signals that are output from the pixels into digital form. Image sensors typically include analog-to-digital convertors (ADCs) to perform such conversion, and various readout and A/D conversion architectures exist. Because pixel readout and A/D conversion take time and because there are numerous pixels in modern image sensors, the time it takes to readout out a single image frame (and hence the time resolution of the device) depends significantly on the pixel readout and A/D conversion architecture. In order to increase the time resolution of the image sensor, most CMOS or DPS image sensor designs include multiple ADCs and readout circuits to allow for faster readout and A/D conversion processing. For example, in a rectangular image sensor of M pixels high and N pixels wide, in general the maximum number of frames per second F would be given by $F=(K*D)/(M*N)$, where K is the number of A/D conversions each ADC can perform per second and D is the number of ADCs in the image sensor. Thus, increasing the number of ADCs increases the maximum frame rate F.

One exemplary readout and A/D conversion architecture is a column-ADC architecture, in which each column of pixels in the image sensor shares a single ADC. In such an architecture, the maximum number of frames per second F would be given by $F=K/M$. A modified column-ADC architecture may include more than one ADC per column to increase the resolution of the image sensor, in which case the maximum number of frames per second F would be given by $F=(K*L)/M$, where L is the number of ADCs per column.

Another exemplary readout and A/D conversion architecture is a Digital Pixel System (DPS) sensor, in which ADCs are included in the circuits of the pixels themselves. For example, an ADC may be included in the circuit of each pixel or in the circuit of one pixel out of each group of pixels, where each group includes a small number of pixels (for example, four pixels). In this architecture, the maximum number of frames per second F would be given by $F=K/G$, where G is the number of pixels per group sharing an ADC. U.S. Pat. No. 6,975,355, the contents of which are incorporated herein by reference in their entirety, describes an exemplary DPS image sensor. This architecture has a very high throughput, and is particularly suitable for global shutter operation and for providing excellent wide dynamic range performance. However, potential disadvantages of the DPS architecture are that the circuit complexity is relatively high, and the method to schedule the operating events in the sensor can be relatively complicated.

Another exemplary readout and A/D conversion architecture is a block-ADC architecture (also known as an area-ADC architecture). In an image sensor with a block ADC design, the pixel array in the image sensor is partitioned into blocks (areas)—for example rectangular blocks of P pixels high by Q pixels wide. The pixels in each block (area) share a single ADC. Hence an image sensor of M pixels high by N pixel wide will use a total number of ADCs equal to $(M/P)*(N/Q)$, assuming that M and N are integer multiples of P and Q, respectively. In the case either M/P or N/Q or both is not an integer, the quantities are rounded up to the next higher integer. In this architecture, the maximum number of frames per second F would be given by $F=(K)/(P*Q)$. An image sensor design with a block ADC has various advantages, including very high throughput, the ability to provide either global shutter or block rolling shutter operation modes, and the ability to be implemented very compactly in silicon using a multi-layered stacked design.

An exemplary image sensor having a block-ADC architecture may be found in the paper "A block-parallel signal processing system for CMOS image sensor with three-dimensional structure," by Kiyoyama et al., published in 3D Systems Integration Conference, pp. 1-4, 2010. Kiyoyama suggests an image sensor having a block-ADC architecture in which one-hundred pixels within a rectangular region share a single ADC and correlated double sampling (CDS) circuits. The circuits of the image sensor are designed in a stacked structure where the sensor elements sit on the top layer. The lower layers include the CDS and the ADC circuits. Sensor elements and circuits in the layers are connected by through holes (through silicon vias, or TSVs) in the integrated circuit. US Publication No. 2013/0236048, the contents of which are incorporated herein by reference in their entirety, discloses an embodiment similar to the stack design of Kiyoyama et al. The device of US2013/023 6048 integrates an image processor within the sensor to implement certain image processing operations such as gradient and key-point detection. The paper "A low-noise high-frame-rate 1 D-decoding readout architecture for stacked image sensors," by Khakoni et al, published in IEEE Sensors Journal, pp. 1966-1973, February 2014, discusses a similar stacked architecture where a rectangle region of pixels shares a single ADC. The design of Khakoni et al. uses a sigma-delta ADC, and it incorporates a 1-D decoding structure to reduce the complexity of the circuitry.

In the block-ADC architecture, the ADCs are often provided in a separate layer from the pixel circuits according to a 3D or stacked image sensor design (such as in the image sensor of Kiyoyama et al.). However, this is not required. In particular, the block-ADC architecture in general does not specify the location of the ADC. Thus, the DPS architecture may be thought of as a special case of the block-ADC architecture, since each group of pixels in the DPS sensor that shares an ADC may be considered a block according to the block-ADC architecture.

FIG. 1 is a block diagram of an exemplary imaging system 10 using an image sensor 100 with the block-ADC architecture. The imaging system 10 includes an optical device 101, the image sensor 100, and an image signal processor 110. The optical device 101 includes one or more lenses that focus incident light onto the image sensor 100. The image sensor 100 includes an array 102 of light sensing elements (pixels), block-ADC circuitry 103, readout circuitry 104, and sequencer/timing control circuitry 108. The light sensing elements of the array 102 and the block-ADC circuitry 103 can be fabricated on different layers and connected via TSVs. The readout circuitry 104 interfaces the output of the block-ADC circuitry 103 and delivers the pixel data to the output of the sensor 100. The sequencer/timing control circuitry 108 controls the ordering and the timing for reading the pixels in the array 102.

As shown in FIG. 2, the pixels of the image sensor 100 are grouped into blocks 200 of P*Q pixels 201. The block-ADC circuitry 103 includes one ADC (not illustrated) per block 200 of P*Q pixels, such that the signals output from each pixel 201 in a given block 200 are A/D converted by the corresponding ADC of the block-ADC circuitry 103. Various exposure/readout methods can be designed for the P*Q pixels 201 in each block 200.

In a block global shutter exposure/readout method, all the pixels 210 in the array 102 are exposed at the same time and thereafter the pixel values in each block 200 are read out sequentially through the ADC corresponding to the block 200, for example in the order 0, 1, . . . PQ-1 that is shown in FIG. 2. That is, after all of the pixels 201 in the entire array 102 have been exposed, the all of $0^{th}$ pixels in each block 200 of the array 102 is read out simultaneously (through their respectively corresponding ADC), followed by all the $1^{st}$ pixels in each block 200 of the array 102 being read out simultaneously (through their respectively corresponding ADC), and so on. After exposure, the pixel values of the block 200 are temporarily stored (for example within the respective pixels 201) while awaiting their turn to be read out of the sensor 100. When the global shutter exposure method is not used, an image of a fast moving object may be distorted because the pixels 201 are not exposed at the same time and the object may have moved noticeably between the time when a first pixel is exposed and the time when a last pixel is exposed. However, when the global shutter exposure method is used this distortion is reduced because all pixels 201 are exposed at the same time.

In a block rolling shutter readout operation, the pixels 201 in the array 102 are not all exposed at the same timing, but rather are exposed sequentially in groups, with read out for each pixel 201 following immediately after the exposure for that pixel ends. For example, each pixel 201 in a block 200 may be exposed and read out at a different timing from the other pixels 201 in the same block 200, and corresponding pixels 201 in different blocks 200 may be exposed and read out at the same timings. For example, all the $0^{th}$ pixels in each block 200 of the array 102 are exposed and read out together, followed by all the $1^{st}$ pixels in each block 200 of the array 102 being exposed and read out together, and so on up to the $(PQ-1)^{th}$ pixels 201. The ordering of the pixel readout shown in FIG. 2 follows a raster scan strategy within each block, i.e. scan the rows from the top to the bottom of each block, and for each row from the left to the right.

FIG. 3 shows the timing of the block rolling shutter readout scheme. Each phase corresponds to the pixels of a sequence number shown in FIG. 2, and since there are P*Q pixels 201 in a block 200, there are P*Q timing phases. Each rectangle with length E represents an exposure and A/D conversion time period for the corresponding phase having a duration time of E seconds. Each phase can begin exposure before the previous phase is completely finished. Since the pixel data are to be A/D converted, the timing of the rolling shutter approach is appropriate as long as the delay time D between each phase is sufficient to ensure that A/D conversion of the preceding phase is completed before A/D conversion of the next phase begins. The time required to scan through all phases is P*Q*D seconds, and hence the maximum possible frame rate is 1/(P*Q*D) frames per second. In practice, there are vertical and horizontal blanking times and hence the frame rate is lower than 1/(P*Q*D). Instead of the raster scanning method, a pseudo random ordering can also be used where the sequence numbers within each block of P by Q pixels are assigned in a pseudo random ordering.

FIG. 4 shows a readout scheme which can be referred to as partial global shutter (PGS), and is especially suitable for color image sensor designs. FIG. 4 (a) shows that the block size of the block ADC is two by two pixels, i.e., P=Q=2. For this design, there are only four phases which are designated according to a 2×2 pixel area. In the PGS design, a block rolling shutter readout operation is used, such as that discussed above. However, because the number of pixels 201 per block 200 in the PGS design is relatively low (e.g., four pixels 201 per block 200), an effect of the readout operation is similar to an effect of a global shutter readout operation. In particular, because only a small number of phases are required, a time between an exposure of a first pixel 201 and a time between an exposure of the last pixel 201 is small, and thus an opportunity for distortion is lowered. Moreover, if each block 200 corresponds to a quad unit of 4 pixels of a color image sensor (discussed further below), then each unit pixel in the ultimate rendered image will have been exposed essentially simultaneously as one another, and thus the effect of the global shutter will be approximated in the ultimate image. In some embodiments, a Bayer color pattern may be used, and each block 200 may correspond to a 2×2 unit of the Bayer pattern as shown in FIG. 4(b). In such a case, each phase corresponds to a color in the Bayer pattern, e.g.: phase 0 corresponds to R, phase 1 corresponds G1 (or Gr), phase 2 corresponds to G2 (or Gb), and phase 3 corresponds to B. The timing of the pixel exposure is illustrated in FIG. 5. This arrangement has an advantage that it can be operated at very high frame rate since there are only four phases. However, the small block size of 2×2 also means that the design requires a relatively large quantity of circuit components to implement the ADCs. It turns out that the PGS design in FIG. 4 also has smaller motion artifact compared to designs with larger block sizes when the sensor 100 moves during image capture. Of course, the PGS design can be used with more than four phases, e.g. 8 phases using a 2×4 or 4×2 block 200 size, 16 phases using a 4×4 block 200 size, . . . , etc.

It is also possible to design an image sensor with a block size of P by Q pixels where P*Q>X, where X is the number of phases (i.e., the number of phases per frame period is less than the number of pixels per block). For example, FIG. 6 illustrates an image sensor design in which each block has 16 pixels but with only four exposure/readout phases. In this case, the pixel values for each P*Q block will need to be stored and read out sequentially within a frame period similar to the design in a full global shutter sensor 100.

When an image sensor 100 is used in a portable electronic device 10 such as a camera, the image sensor 100 is frequently subjected to motion due to movement of the camera holder (whether a human being or a mechanical device). Such motion causes geometric distortions in the image when the image sensor 1000 is not a global shutter design, i.e., when the pixels are not all exposed at the same time. Motion artifacts are especially observable when the camera is operating under zoom conditions, e.g., with a zoom lens. Modern digital cameras can support relatively high optical zoom factors such as 50X. For a fixed range of motion and a fixed shutter speed, a larger zoom factor will result in a higher distortion since the effect due to motion is magnified by the optical zoom system. The artifacts due to motion can cause the images taken by the camera to be highly objectionable. This can mean that a picture taken with a hand-held camera even with a relatively steady hand can have unacceptable motion distortions especially when operating at a high zoom condition.

Accordingly, motion compensation, which uses motion information to correct for motion shifts, has been developed in the video compression field. Such motion compensation methods typically work in the YCbCr color space, and frequently in sub-sampled arrangements such as 4:2:2. In other words, the known motion compensation methods in video compression work on image data that has already been processed by an image signal processor.

SUMMARY

In an image sensor 100, the pixel data is in the raw domain (such as in a Bayer configuration, for example), which is very different from the configurations used in video compression. Hence the known motion compensation methods in the field of video compression are not applicable to the raw image data in image sensors 100 because of the different data format and configurations in image sensors 100. As a result, it is desirable to have a method that corrects for the motion in an image sensor with a block ADC architecture using raw pixel processing.

According to an exemplary illustration of the present disclosure, an electronic device may include a motion sensor and motion correction circuitry. The motion sensor may be configured to detect motion of the electronic device and output motion information based on the detected motion. The motion correction circuitry may be configured to correct raw domain image data, received from an image sensor that has a block-based analog-to-digital converter architecture, based on the motion information. The corrected image data may be output in a same raw domain image data format as the uncorrected raw domain image data.

BRIEF DESCRIPTION OF THE DRAWINGS

These and other more detailed and specific features of the present invention are more fully disclosed in the following specification, reference being had to the accompanying drawings, in which:

FIG. 8 is a conceptual diagram illustrating a Bayer color filter pattern.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

[Configuration of Imaging System]

Figure 7A:
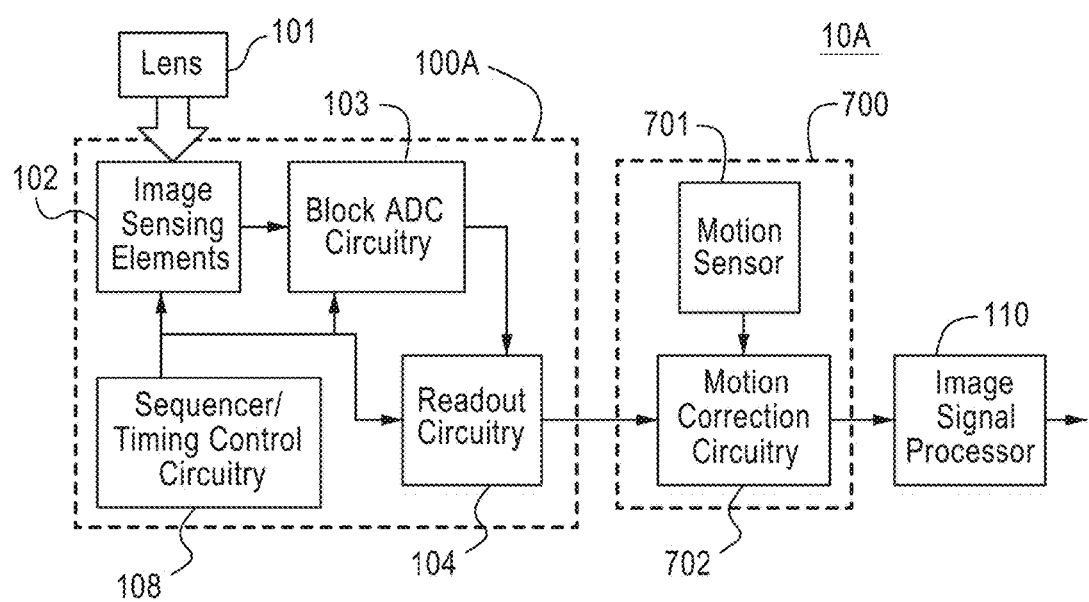
FIGS. 7A-C are a conceptual diagrams illustrating imaging systems 10A-C.
Figure 7B:
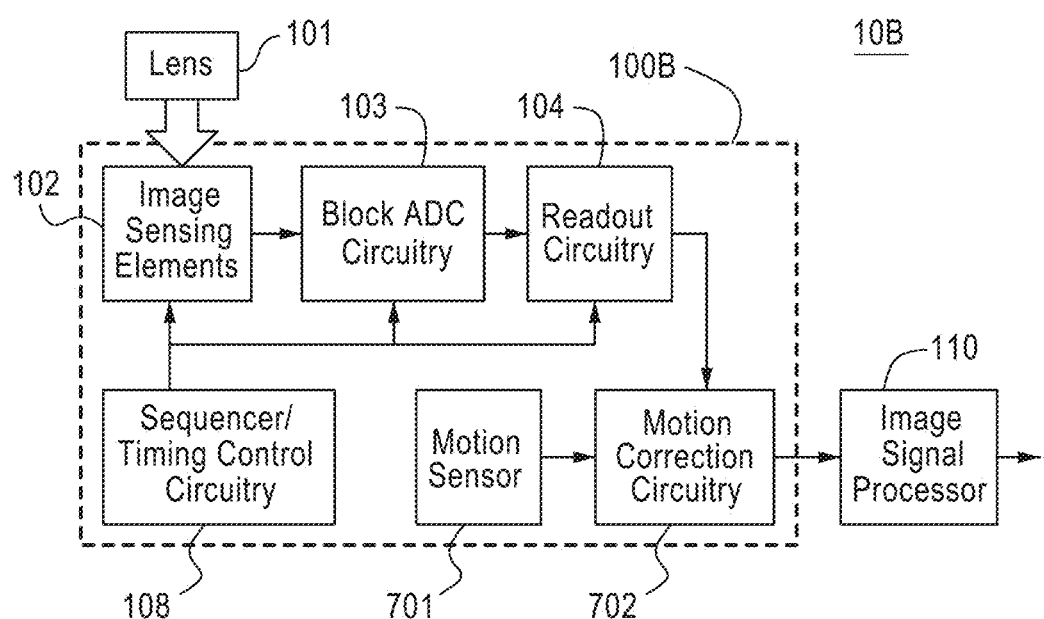
Figure 7C:
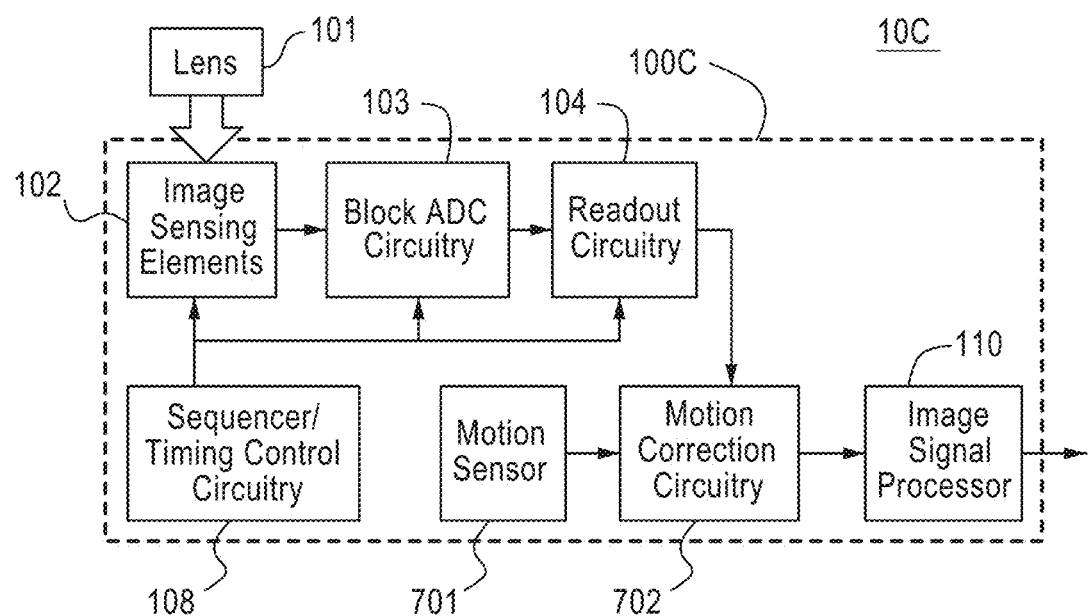

FIGS. 7A-7C illustrate exemplary imaging systems 10A-10C. Each of the imaging systems 10A-10C includes an optical device 101, an image sensor 100A-100C, and an image signal processor 110. The optical device 101 includes one or more optical elements that guide incident light onto the image sensor 100A-C. For example, the optical device 101 may comprise an objective lens that focuses the light so as to form an image on the image sensor 100A-C, and may additionally or alternatively include zoom lenses, micro lens arrays, and other optical elements as well known in the art. Each of the image sensors 100A-100C includes an array 102 of light sensing elements (pixels) 201, block-ADC circuitry 103, readout circuitry 104, and sequencer/timing control circuitry 108. The light sensing elements 201 of the array 102 and the block-ADC circuitry 103 can be fabricated on different layers and connected via TSVs. The readout circuitry 104 interfaces the output of the block-ADC circuitry 103 and delivers the pixel data to the output of the sensor 100A-100C. The sequencer/timing control circuitry 108 controls the ordering and the timing for reading the pixels in the array 102.

Figure 1:
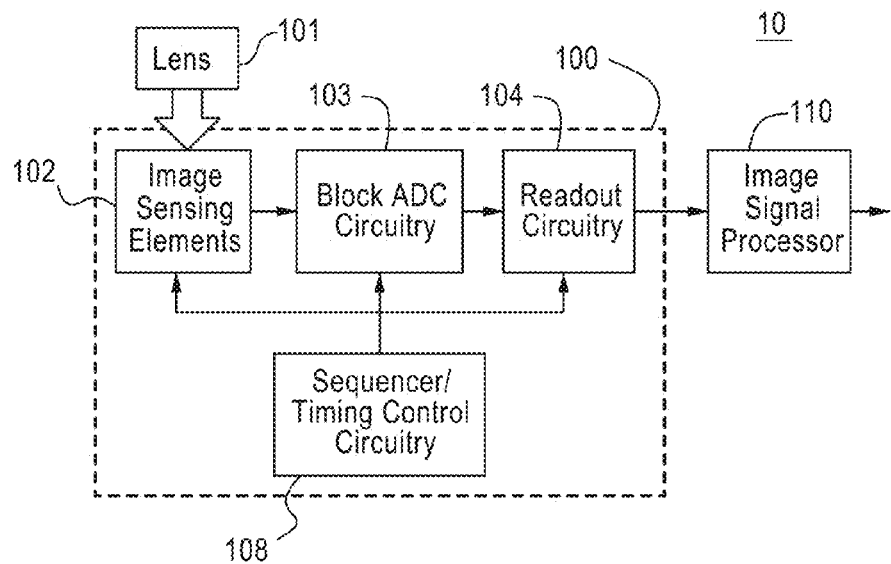
FIG. 1 is a conceptual diagram illustrating an imaging system 10.
Figure 2:
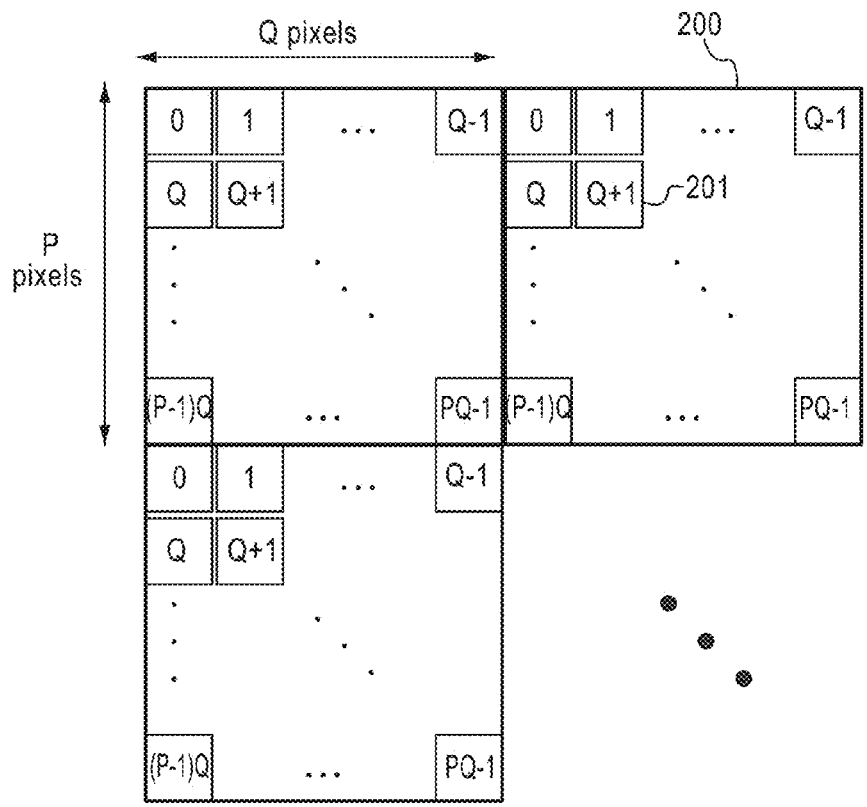
FIG. 2 is a conceptual diagram illustrating a block based ADC architecture.
Figure 3:
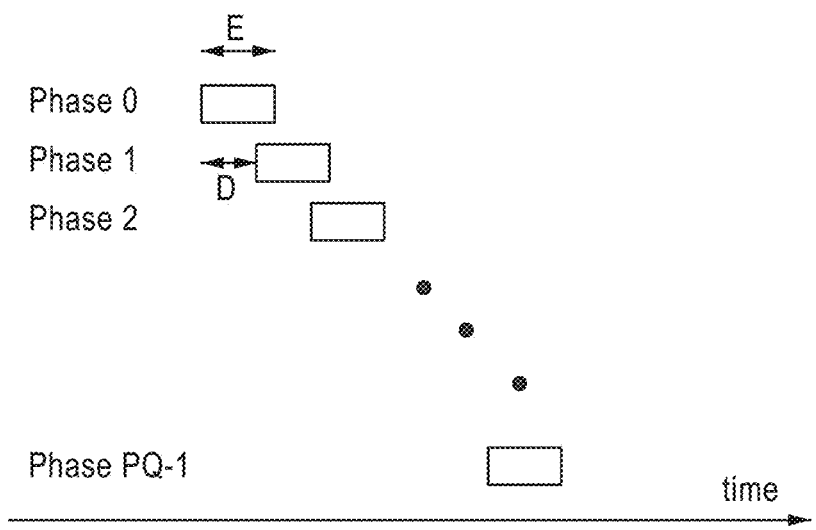
FIG. 3 is a timing diagram illustrating a rolling shutter operation of the block based ADC architecture of FIG. 2.

In contrast to the imaging system 10 of FIG. 1, the exemplary imaging systems 10A-10C of FIGS. 7A-7C additionally include components for raw domain image data motion correction. Specifically, each of the imaging system 10A-B includes at least a motion sensor 701 and motion correction circuitry 702 for performing raw domain image data motion correction. The motion sensor 701 and the motion correction circuitry 702 may be provided in various modular configurations relative to one another and to the other components of the imaging system 10A-10C. In particular, an imaging system may be formed by combining separately prepared modules/circuit packages/devices (which may or may not have been manufactured by different parties); the motion sensor 701 and the motion correction circuitry 702 may be provided in any of a number of such modular configurations. FIGS. 7A-7C illustrate three examples of such modular configurations, but it will be understood that other modular configurations are also possible.

In a first exemplary configuration, the motion sensor 701 and motion correction circuitry 702 are provided in a module/circuit-package/device (e.g., motion correction module 700) that is distinct from a module/circuit-package/device of the image sensor 100A. In this configuration, the motion correction module 700 may be manufactured separately from the image sensor 100A, and, for example, the motion correction module 700 and the image sensor 100A may be subsequently combined (along with additional components) as part of assembling an imaging system. For example, FIG. 7A illustrates one exemplary imaging system 10A utilizing the first exemplary configuration in which the motion correction module 700, the image sensor 100A, the optical device 101, and the image signal processor 110 are combined to form the imaging system 10A.

In a second exemplary configuration, the motion sensor 701 and motion correction circuitry 702 are provided as part of the same module, circuit-package, or device as the other components of the image sensor 100B, which may be referred to herein as a motion compensated image sensor 100B. This motion compensated image sensor 100B produces output in raw image data format with the image content being free from the artifacts that arise from motion of the image sensor 100B. The motion-compensated raw image data output from the image sensor 100B may be stored as the raw image data for the imaged scene, and/or may be subjected to additional image signal processing, for example by an image signal processor 110. For example, FIG. 7B illustrates one exemplary imaging system 10B utilizing the second exemplary configuration, in which the image sensor 100B, the optical device 101, and the image signal processor 110 are combined to form the imaging system 10B.

In a third exemplary configuration, the motion sensor 701, the motion correction circuitry 702, and the image signal processor 110 are provided as part of the same module, circuit-package, or device as the other components of the image sensor 100C. This motion compensated image sensor 100C outputs fully rendered images, such as full RGB data where every pixel includes R, G, and B components. For example, FIG. 7C illustrates one exemplary imaging system 10C utilizing the third exemplary configuration, in which the image sensor 100C and the optical device 101 are combined to form the imaging system 10C.

The three exemplary configurations illustrated in FIGS. 7A-7C are provided merely as examples, and it will be understood that other configurations are within the scope of this disclosure. For example, the motion sensor 701 and the motion correction circuitry 702 do not have to be part of the same module, circuit-package, or device as one another or as any other components of the imaging system. Furthermore, the components of the image sensors 100A-100C and the components of the imaging systems 10A-10C discussed above are provided merely as examples, and additional or fewer components may be provided.

Furthermore, the imaging systems 10A-10C may be included in a variety of electronic devices. For example, a digital camera may be equipped with the imaging system 10A-10C. As another example, a smart phone may be equipped with the imaging system 10A-10C. As another example, a personal computer may be equipped with the imaging system 10A-10C.

Figure 8:
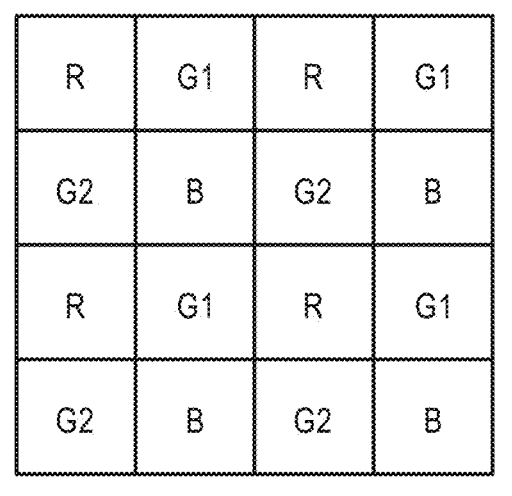

The light sensing elements (pixels) 201 can be either monochrome or colored. For example, in an image sensor 100A-100C utilizing colored light sensing elements 201, each light sensing element 201 is covered with color filters arranged in a color mosaic (color pattern). Various embodiments disclosed herein use the Bayer configuration of color filters, which is illustrated in FIG. 8 (although only 16 pixels are illustrated in FIG. 8, it will be understood that the color pattern shown is repeated across the pixel array 102). Although the Bayer configuration is used herein as the primary example of a color configuration, other color filter configurations can also be used, which are well known in the art and thus will not be described herein in greater detail. Color sensors can be, for example RGB sensors, CMY sensors, CMYG sensors, RGBW sensors, etc.

[Motion Compensation]

In an image sensor 100A-C having a block-based architecture in which a PGS exposure/readout method is used, there are P*Q exposure phases (recall that each block has P*Q pixels 201). The P*Q pixels 201 within each block are exposed sequentially in the P*Q exposure phases, and pixels 201 that are in corresponding positions in the blocks are exposed at the same time. Thus, all of the pixels 201 in the array that are in a $0^{th}$ position within their respective blocks are exposed in the $0^{th}$ phase, all of the pixels 201 in the array that are in a $1^{st}$ position within their respective blocks are exposed in the $1^{st}$ phase, and so on up to the $(P*Q-1)^{th}$ phase in which all of the pixels 201 in the array that are in a $(P*Q-1)^{th}$ position within their respective blocks are exposed.

The motion sensor 701 detects motion of the imaging system 10A-C that occurs during the P*Q exposure phases, and outputs motion information describing this motion. The motion sensor 701 can be composed of any sensor (or combination of sensors) capable of detecting the motion of the imaging system 10A-C, examples of which include: gyroscopes, accelerometers, microelectromechanical systems (MEMS) sensors, piezoelectric sensors, etc.

The motion information output by the motion sensor 701 may include (or may be used to generate) a phase-specific motion vector for each of the P*Q phases, which describes motion of the image sensor 100A-C between a timing at which imaging of a given image frame starts and a timing that is associated with the phase to which the motion vector corresponds. Herein, the following notation will be used: $\overline{\delta s_i}$ designates the phase-specific motion vector that corresponds to the $i^{th}$ phase, where i is an index identifying the phase, and $t_i$ designates a timing that is associated with the $i^{th}$ phase. Thus, using the aforementioned notation, the vector $\overline{\delta s_i}$ may describe motion (i.e., the change in position) of the image sensor 100A-C that occurs between the start timing $t_0$ and the timing $t_i$. The vector $\overline{\delta s_i}$ may be determined and output by the motion sensor 701, or may be determined by the motion correction circuitry 702 based on the motion information output by the motion sensor 701.

In certain embodiments, the motion information output by the motion sensor 701 may include a continuous stream of motion vectors that indicate the motion of the system 10A-C at sampled time intervals, and each of the phase-specific motion vectors $\overline{\delta s_i}$ may be equal to the vector sum of the motion vectors that were output by the motion sensor 701 between $t_0$ and the timing $t_i$ (the motion correction circuitry 702, for example, may perform the aggregation). In some of these embodiments, the sampling time interval of the motion sensor 701 may be set so as to correspond to the interval between consecutive timings $t_i$. In other embodiments, the sampling time intervals of the motion sensor 701 may be of any arbitrary duration that is less than a duration of the exposure/readout phase.

In other embodiments, the motion information output by the motion sensor 701 is not a stream of motion vectors, but rather may be, for example, data that is interpreted by the motion correction circuitry 702 to obtain the motion vectors $\overline{\delta s_i}$. For example, the motion information output by the motion sensor 701 may include orientation information from one or more gyroscopes, acceleration information from one or more accelerometers, measurements from magnetometers, etc.

Of course, the motion of the image sensor 100A-C occurs in real space, and thus is three-dimensional, whereas the captured image is a two-dimensional representation of the three-dimensional imaged scene. Thus, the motion information detected by the motion sensor 701 may need to be converted into suitable two-dimensional format to be usable by the correction process—for example, the motion vectors $\overline{\delta s_i}$ may be the projection of the three-dimensional motion vectors onto the image plane of the image sensor 100A-C. This conversion from three-dimensional motion information to two-dimensional motion information may be done by the motion sensor 701, or by the correction circuitry 702.

Moreover, the motion of the image sensor 100A-C may include rotational motion in addition to translational motion, and this motion may be corrected for as well. For example, a given rotational motion of the image device may be approximated by a translational motion vector that would produce approximately the same effect on the output image as the given rotational motion, and this translational motion vector may be used to correct the image data. For example, it may be determined (experimentally or mathematically), that, for a given focal point, a rotation of the camera in a given direction by x degrees changes the locations of objections in the resulting image by approximately the same amount as a translational movement of the camera of y mm without rotation, and thus a translational motion vector $\overline{\delta s_i}$ of magnitude y mm may be used to approximate the rotation of x degrees. The conversion of rotational motion information into a translational motion vector that approximates the rotational motion may be performed by the motion sensor 701, or by the correction circuitry 702. Of course, when rotational and translational motion both occur during a given phase, the motion can be combined into an overall motion vector that represents both the rotational and translation motion. In particular, if the rotation of the image sensor 100A-C up to the $i^{th}$ phase is approximated by $\overline{\delta s_i}^{rotation}$ and if the two-dimensional translational motion of the image sensor 100A-C up to the $i^{th}$ phase is given by $\overline{\delta s_i}^{translation}$, then the motion vector $\overline{\delta s_i}$ that is used in the correction processing for pixel values of the $i^{th}$ phase would equal the vector sum $\overline{\delta s_i}^{rotation} + \overline{\delta s_i}^{translation}$. Accordingly, hereinafter the motion vectors $\overline{\delta s_i}$ will be assumed to be in two-dimensional format and to represent the two dimensional approximation of all of the various types of motion of the image sensor 100A-C combined.

The timings $t_i$ associated with each phase may be defined in various ways. For example, the timing $t_i$ may correspond to the start of the $i^{th}$ exposure phase. As another example, the timing $t_i$ may be halfway through the $i^{th}$ exposure phase. As another example, the timing $t_i$ may correspond to the end of the $i^{th}$ exposure phase.

The motion correction circuitry 702 receives the stream of motion information from the motion sensor 701 and the raw pixel data from the readout circuitry 104, and applies motion correction to the raw pixel data based on the motion information. The motion correction (discussed further below) produces output data in the same data format as the raw data. Thus, for example, if the data input to the motion correction circuitry 702 is monochrome raw format, the data output from the motion correction circuitry 702 is monochrome raw format, or if the data input to the motion correction circuitry 702 is color Bayer raw format, the data output from the motion correction circuitry 702 is color Bayer raw format, etc. The motion correction circuitry 702 may be constituted by custom designed logic circuits such as application specific integrated circuit (ASIC), field programmable gate array (FPGA), other programmable logic circuits, or hardwired discrete logic circuits, etc. Alternatively, it can also be implemented such as embedded software running on a digital signal processor (DSP) in the image sensor, or general purpose graphics processing unit (GPU) or general purpose central processing unit (CPU). Furthermore, the motion correction circuitry can also be implemented using hardware or software modules external to the image sensor, wherein such external hardware and software modules would be linked to the image sensor via communication buses or standard interfaces such as parallel interfaces or high speed serial interfaces.

Figure 4:
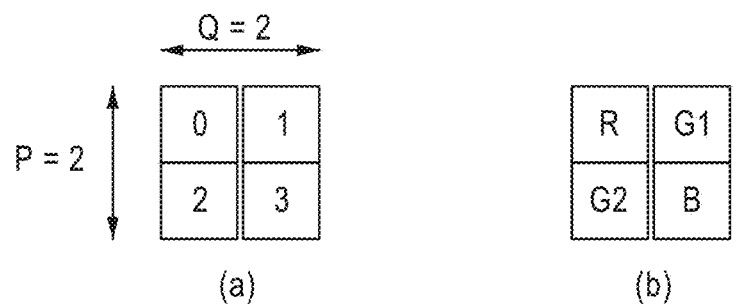
FIG. 4 is a conceptual diagram illustrating a PGS architecture.
Figure 5:
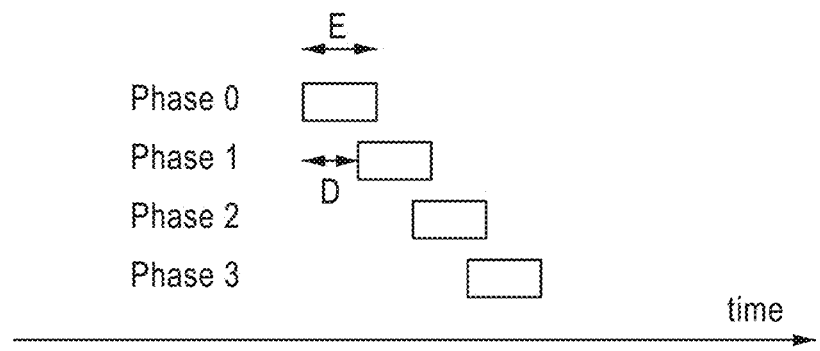
FIG. 5 is a timing diagram illustrating a rolling shutter operation of the PGS architecture of FIG. 2.

FIGS. 9-14 illustrate an exemplary motion correction process executed by the motion correction circuitry 702. In the exemplary process illustrated in FIGS. 9-14, it is assumed that the exemplary image sensor 100A-C has four-pixels per block (P=Q=2) and a Bayer color configuration, such as is illustrated in FIG. 4, and that a PGS exposure/readout method is used, such as is illustrated in FIG. 5. Based on these assumptions, there are four different phases in which pixels 201 of the exemplary image sensor 100A-C are exposed to light, and each of these phases corresponds to all of the pixels of a given primary color of the Bayer configuration (R, G1, G2 or B). Thus, if the pixels in each block are read out in the order of R, G1, G2, and B, then the $0^{th}$ phase corresponds to all R pixel values, the $1^{st}$ phase corresponds to all G1 pixel values, the $2^{nd}$ phase corresponds to all G2 pixel values, and the $3^{rd}$ phase corresponds to all B pixel values.

Figure 9:
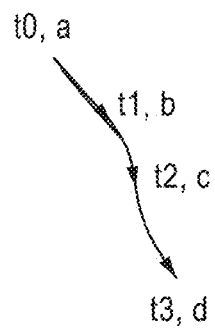
FIG. 9 is a conceptual diagram illustrating motion of the image sensor 100A-C.
Figure 10:
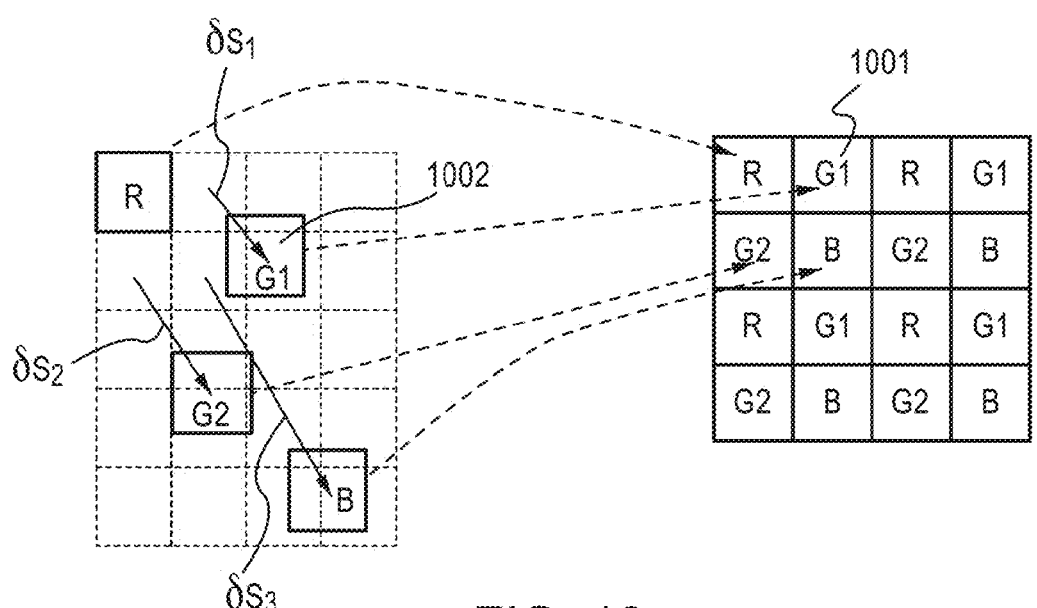
FIG. 10 is a conceptual diagram illustrating locations of objects in a scene and locations in the image of the pixel values corresponding to the objects.

If there is no motion of the image sensor 100A-C between the exposure phases, then the pixels 201 would capture the objects in the scene according to the physical location of each pixel 201 in the image sensing array 102, and the image signal processor 110 would process the image into rendered images free from motion artifacts. However, because there almost always is motion of the image sensor 100A-C, the correct location of an object in the scene may not be captured in the image. For example, FIG. 9 illustrates exemplary motion of the image sensor 100A-C in four phases corresponding to time periods t0-t3, with the arrows representing the motion of the image sensor 100A-C during each phase. FIG. 10 includes a diagram that illustrates object locations in a scene on the left side of the diagram and pixel locations in the captured image on the right side of the diagram. As shown in FIG. 10, the captured objects are all located in the captured image at the pixel locations of the pixels that captured the respective objects (see the right side of the diagram), and these locations are different from the actual locations of the objects in the scene (see the left side of the diagram) due to the movement of the image sensor 100A-C that is shown in FIG. 9. For example, as shown in FIG. 10, when the G1 pixels are exposed in the first phase, the image sensor 100A-C has moved according to the vector $\overline{\delta s_1}$, and therefore the G1 pixels during the first phase are actually imaging objects that are located in the scene at positions that are shifted based on the vector $\overline{\delta s_1}$ from the locations in the scene that would correspond to the G1 pixel locations in the image if the motion had not occurred. In particular, the G1 pixel located at pixel position 1001 in the image would image an object in the scene located at position 1001 if there were no motion; however, because of the motion, the G1 pixel located at 1001 actually images an object that is located in the scene at position 1002, not the object at the position 1001. Similar effects occur with respect to the G2 pixels (locations shifted based on the vector $\overline{\delta s_2}$) and the B pixels (locations shifted based on the vector $\overline{\delta s_3}$), as illustrated in FIG. 10. Thus, the locations of the objects captured by the G1, G2, and B pixels in the image do not accurately reflect the true locations of these objects in the scene. Note that in this example the locations of R pixels in the image do correctly reflect the locations of the objects in the scene, because the $0^{th}$ phase (R phase) is the initial imaging phase and the location of the image sensor 100A-C during this phase defines the scene being imaged and servers as a baseline from which further motion is measured. Thus, no vector $\overline{\delta s_0}$ needs to be generated, or if the vector $\overline{\delta s_0}$ is generated then it may be set to zero or ignored.

In order to correct for the motion induced errors noted above, the motion correction circuitry 702 moves each pixel value of the originally captured image, based on the motion information, to a corrected location that corresponds to the actual location in the scene of the object that was imaged by the pixel. Then, the pixel values at their corrected locations are interpolated to obtain pixel values in a corrected image frame.

Figure 11:
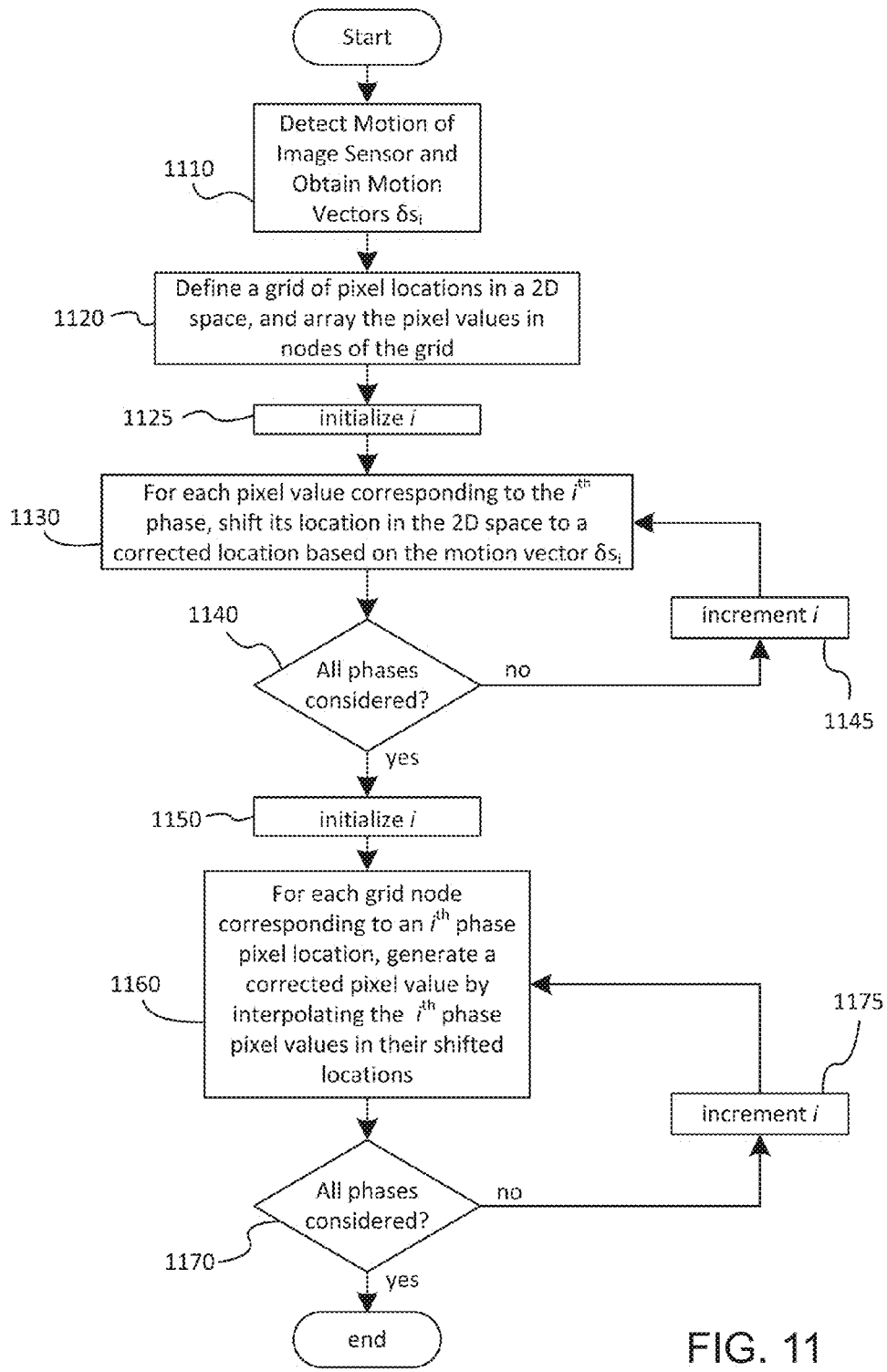
FIG. 11 is process flow chart illustrating an exemplary motion correction process.

For example, FIG. 11 illustrates an exemplary process for motion correction. In step 1110, the motion of the image sensor 100A-C is detected by the motion sensor 701, and the phase specific motion vectors $\overline{\delta s_i}$ are obtained. In the example noted above in which there are four phases, the motion vectors $\overline{\delta s_1}$ through $\overline{\delta s_3}$ may be obtained.

Figure 6:
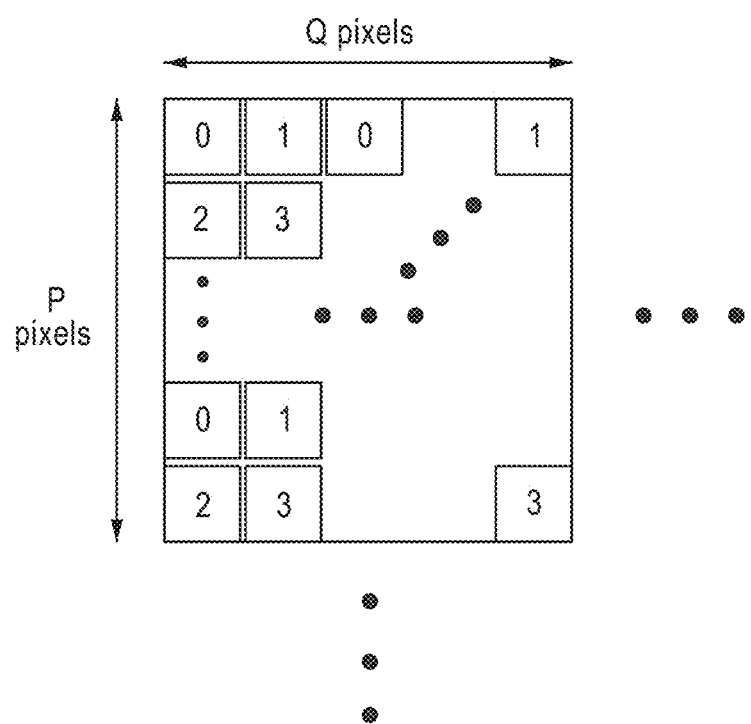
FIG. 6 is a conceptual diagram illustrating a block based ADC architecture with more pixels per block than exposure phases.

In block 1120, a grid of pixel locations is defined in a hypothetical two-dimensional space, and the pixel values of an image frame are arrayed in nodes of the grid based on the relative locations of the pixels within the array 103 that output the pixel values. In other words, a nominal location for each pixel value is determined in the two-dimensional space, each nominal location corresponding to a grid node. Each of the nodes of the grid will correspond to an imaging phase based on the architecture of the image sensor 100A-C. For example, if the image sensor 100A-C uses a Bayer color pattern as shown in FIG. 8 and a PGS architecture with a 4 pixel group as shown in FIGS. 5-6, then the four phases will correspond to the colors R, G2, G2, and B, and each node in the grid will correspond to one of the colors in the same pattern as that shown in FIG. 8.

Figure 12:
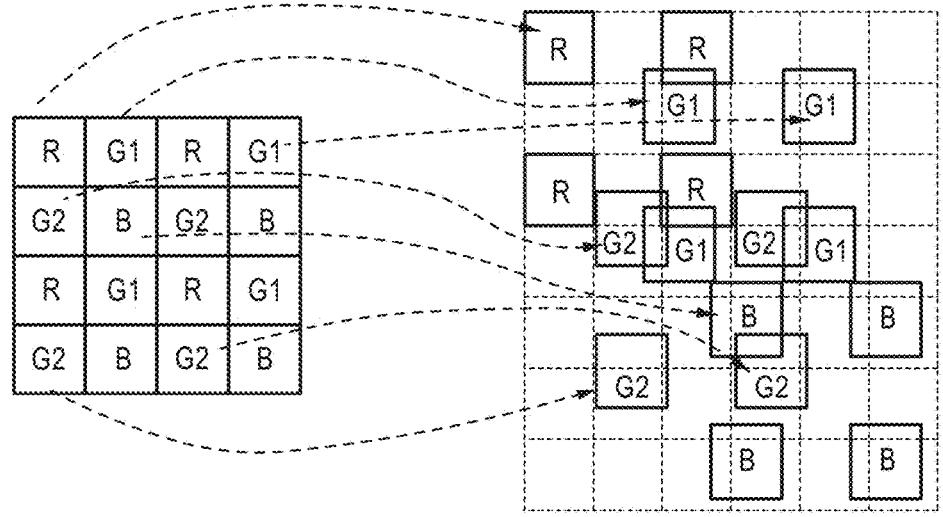
FIG. 12 is conceptual diagram illustrating uncorrected locations of pixel values in a two-dimensional space and corrected locations of the pixel values.
Figure 13:
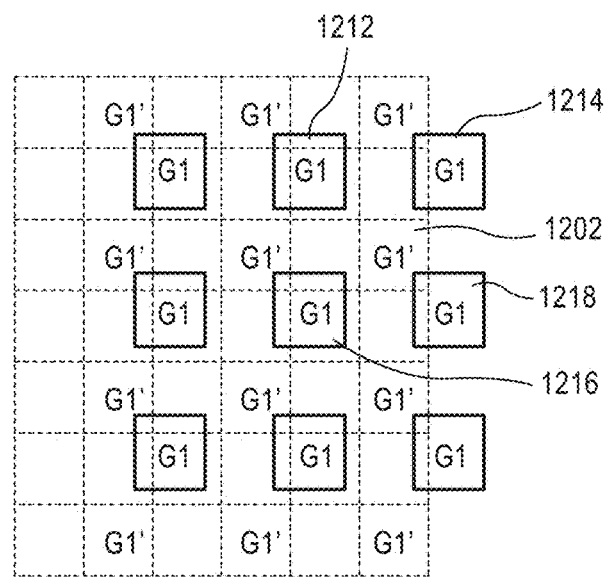
FIG. 13 is conceptual diagram illustrating corrected locations of G1 pixel values and grid nodes corresponding to the G1 phase.

In block 1125, the index i is initialized, and then in block 1130, the locations of the pixel values corresponding to the $i^{th}$ phase are shifted to corrected locations based on the motion vector $\overline{\delta s_i}$. This is then repeated in a loop for each phase, with i being incremented each cycle (block 1145) until all desired phases have been considered (block 1140), at which point the process proceeds to block 1160. For example, when a Bayer pattern with four phases is used, the locations of the G1 pixels are all shifted to corrected locations based on the motion vector $\overline{\delta s_1}$, the locations of the G2 pixels are all shifted to corrected locations based on the motion vector $\overline{\delta s_2}$, and the locations of the B pixels are all shifted to corrected locations based on the motion vector $\overline{s_3}$; note that the R pixels are either not considered in step 1130 (i is initialized to 1, and the $0^{th}$ phase is ignored), or if they are considered in step 1130, then the vector $\overline{\delta s_0}$ may be set to zero, and hence their locations are not shifted. A visual representation of this process is found in FIG. 12. The left side of the diagram in FIG. 12 illustrates locations of the pixel values in the captured image. The right side of the diagram in FIG. 12 illustrates the locations of the pixel values in the hypothetical two-dimensional space after being shifted according to the motion vectors. As can be seen in FIG. 12, the pixel values in the captured image are arrayed in a regular grid (left side of FIG. 12), whereas the corrected locations of the pixel values in the two-dimensional space after being shifted (right side of FIG. 12) are irregularly spaced. However, as can be seen in FIG. 13, when only one color plane is considered at a time (e.g., the G1 color plane in FIG. 13), that color plane's shifted pixel values do form a regular array, which is shifted relative to the array defined by the G1' grid nodes.

Of course, it will be understood that the locations of the pixels being discussed above are locations in a hypothetical two-dimensional space, which corresponds to an image frame. In particular, the location of each pixel value output by the image sensor 100A-C in the grid is determined based on the physical location in the array 102 of the pixel that generated the pixel value. The location of the pixel value in the image frame may be determined, for example, based on the order in which the pixel values are output from the image sensor 100A-C. The absolute distance between each grid node in the hypothetical two-dimensional space may be arbitrarily set. Based on how the distance between grid nodes is defined, a relationship between the distance that the image sensor 100A-C moves during imaging ($\overline{\delta s_i}$) and a distance that the pixel values should be shifted during correction may be defined. For example, if the image sensor 100A-C moves in real space by the vector $\overline{\delta s_1}$ during the first phase, then the first phase pixel values may be shifted in the hypothetical two-dimensional space by the vector $\gamma \cdot \overline{\delta s_1}$, where $\gamma$ is a factor relating distances in real space to distances in the hypothetical two-dimensional space. $\gamma$ may be arbitrarily set to any value that optimizes the motion correction processing. For example, $\gamma$ may be determined experimentally for a given image sensor 100A-C by using different values and selecting the value that returns the best looking image. In addition to this, or in the alternative, known physical characteristics of the image sensor 100A-C and the lens, as well as known relationships between these characteristics and resulting images may be used to determine a mathematically.

After shifting the locations of the pixel values to the corrected locations based on the motion information (blocks 1125 through 1145), the process proceeds to blocks 1150 through 1175 to generate corrected pixel values for each node of the grid by interpolating the pixel values as shifted.

In particular, in block 1150, the index i is reinitialized, and then in block 1160 a corrected pixel value is generated for each node of the grid that corresponds to the $i^{th}$ phase by interpolation from at least one of the pixel values in its shifted location. This process is then repeated for each phase (block 1175) until all the phases have been considered (1170), whereupon the process ends. In the exemplary process of block 1160, the $i^{th}$ phase corrected pixel values are generated using only $i^{th}$ phase pixel values, which is particularly well suited to color image sensors 100A-C in which each phase corresponds to a different color of pixel. For example, as shown in FIG. 13, a corrected pixel value may be generated for each of the nodes of the grid that corresponds to the G1 phase (these nodes are labeled G1' in FIG. 13) by interpolating from the G1 phase pixel values in their shifted locations (these shifted locations are labeled G1 in FIG. 13). Similarly, a corrected pixel value is generated for each of the nodes of the grid corresponding to the G2 phase based on the G2 phase pixel values in their shifted locations, and a corrected pixel value is generated for each of the nodes of the grid corresponding to the B phase based on the B phase pixel values in their shifted locations. However, it will be understood that a corrected pixel value for a node corresponding to a given phase may also be generated by interpolating from pixel values that correspond to a different phase, which may be especially well suited to the case of a monochrome image sensor 100A-C.

Figure 14:
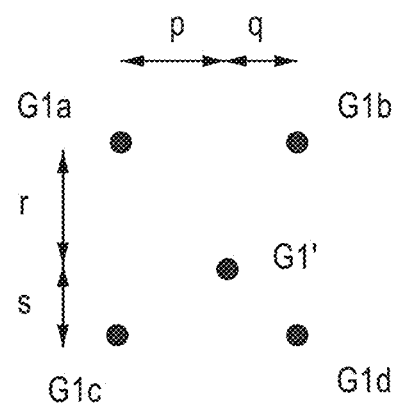
FIG. 14 is conceptual diagram illustrating bi-linear interpolation.

The motion corrected pixel values for each node of the grid can be determined by any interpolation strategy. For example, the corrected pixel value may simply be set to equal the nearest neighboring shifted pixel value—this may be the nearest shifted pixel value corresponding to the same phase as the corrected pixel value, or it may be the nearest shifted pixel value of any phase, depending on the desired effect. As another example, the corrected pixel value may be set to equal a weighted average of the several nearest neighboring shifted pixel values—again, these may be the nearest neighboring shifted pixel values that correspond to the same phase as the corrected pixel value, or these may be the nearest neighboring shifted pixel values of any phase, depending on the desired effect. As another example, a bi-linear interpolation method may be used. For example, in FIG. 13 the G1 corrected pixel value for the grid node 1202 may be obtained using bi-linear interpolation from the G1 pixel values located at the shifted positions 1212, 1214, 1216, and 1218, which are the four nearest G1 pixel values in the neighborhood of the grid node 1202. The bi-linear interpolation is performed using the formula:

$$G1'=\alpha\beta G1_a+(1-\alpha)\beta G1_b+\alpha(1-\beta)G1_c+(1-\alpha)(1-\beta)G1_d \qquad (\text{eq.1})$$

where G1' is the corrected pixel value being generated, $G1_a$ is the pixel value of the upper left nearest neighbor, $G1_b$ is the pixel value of the upper right nearest neighbor, $G1_c$ is the pixel value of the lower left nearest neighbor, $G1_d$ is the pixel value of the lower right nearest neighbor, $\alpha=q/(p+q)$, $\beta=s/(r+s)$, and r, s, p, and q are the distances shown in FIG. 14. Corrected pixel values for grid nodes corresponding to G2 or B can also be obtained using the same formula, but using neighboring G2 or B pixel values, respectively, instead of neighboring G1 pixel values, and using values $\alpha$ and $\beta$ that correspond to the respective shifted positions of G2 and B.

Figure 15A:
FIGS. 15A-B illustrate exemplary images taken without motion correction processing and with motion correction processing.
Figure 15B:
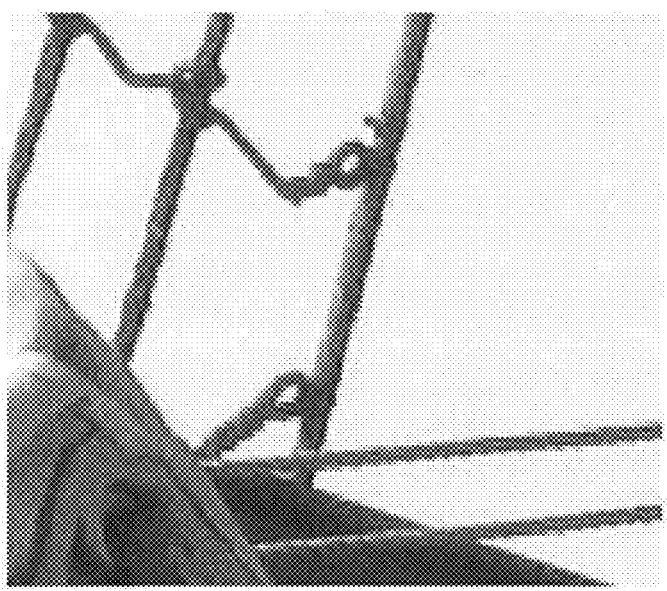

Thus, by the process described above, a corrected pixel value is generated for each node of the grid, based on the pixel values whose locations have been shifted to corrected locations based on the motion vectors. These corrected pixel values may then be output as a motion corrected image frame in the same raw data format in which the pixel values were originally output by the image sensor 100A-C. FIGS. 15(a) and (b) show image examples of an image taken by an image sensor 100A-C with a block ADC architecture in which P=Q=2. In FIG. 15(a), the motion correction processing was not performed, and color fringe artifacts can be observed in the image. FIG. 15(b) shows the same image with motion correction performed in the raw domain by the process described above, and significant improvement in the image quality is clearly achieved.

Figure 16:
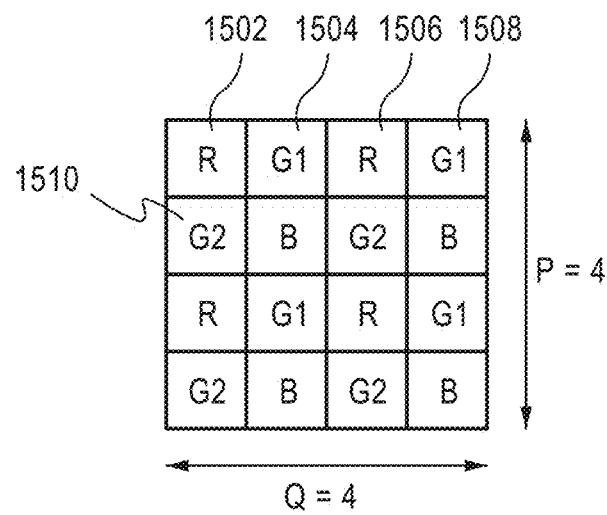
FIG. 16 is conceptual diagram illustrating a block based ADC architecture with sixteen pixels per block and a Bayer color filter pattern.
Figure 17:
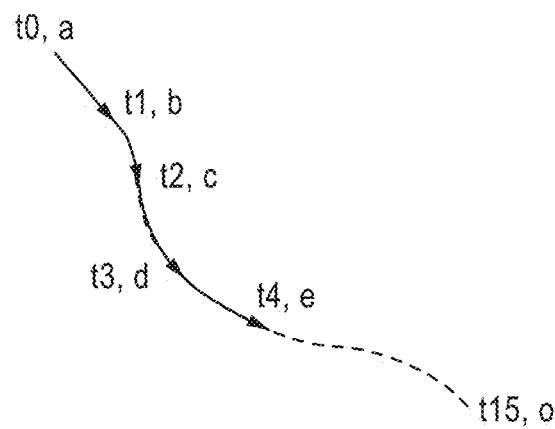
FIG. 17 is a conceptual diagram illustrating motion of the image sensor 100A-C.
Figure 18:
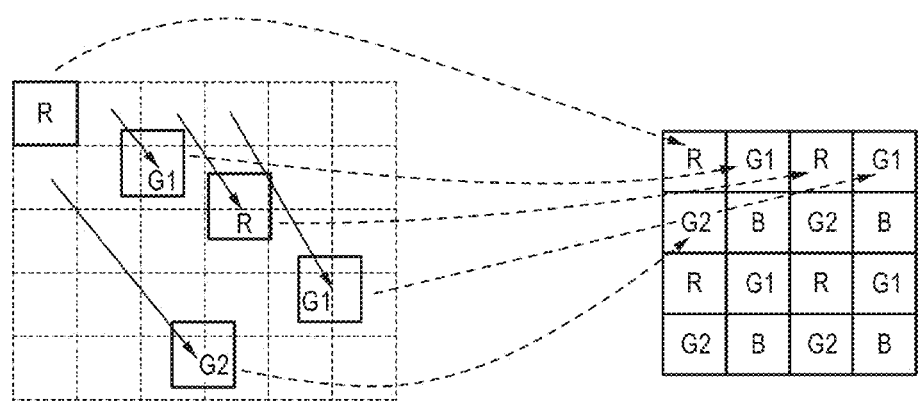
FIG. 18 is a conceptual diagram illustrating locations of objects in a scene and locations in the image of the pixel values corresponding to the objects.

Although the examples discussed above focus on the case in which there are four phases, this is not the only possible configuration. For example, FIG. 16 illustrates a PGS architecture in which P=Q=4, and thus there are 16 phases. Motion vectors $\overline{\delta s_i}$ for these 16 phases are illustrated in FIG. 17. In such an example, the pixels of a given color are not all sampled during the same phase—for example, some of the R pixels are sampled in the $0^{th}$ phase, some are sampled in the $2^{nd}$ phase, some are sampled in the $8^{th}$ phase, and some are sampled in the $10^{th}$ phase. Because the motion vectors for these different phases are not necessarily the same, the pixel values of a given color plane are not in a regular grid after being shifted, in contrast to the case of a P=Q=2 image sensor 100A-C. For example, in FIGS. 18 and 19 it can be seen that the location of the second R pixel value is shifted relative to the position of the first R value due to differences between the motion vector $\overline{\delta s_i}$ (which is zero) and the motion vector $\overline{\delta s_2}$ (which is non-zero). In addition, in a monochrome image sensor 100A-C there is only a single color plane, and in this case the shifted pixel values are also in an irregular array. In such a case, the bi-linear interpolation method described above cannot be applied to determine a corrected pixel value for a grid node corresponding to a given color plane, because the pixel values of that color plane after shifting are no longer in a regular grid.

Figure 19:
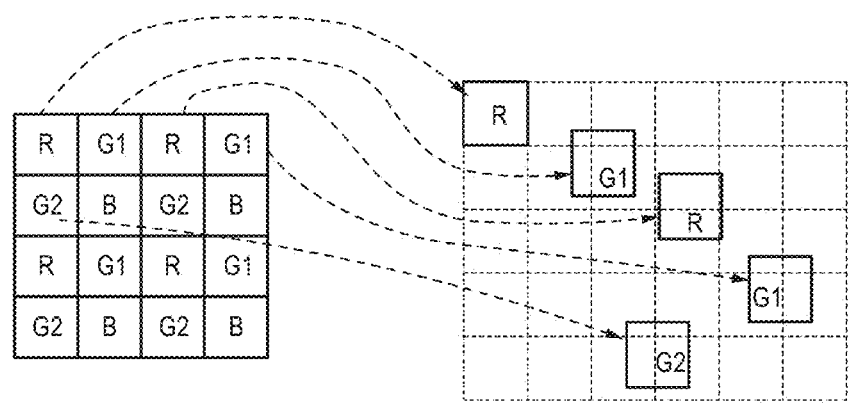
FIG. 19 is conceptual diagram illustrating uncorrected locations of pixel values in a two-dimensional space and corrected locations of the pixel values.
Figure 20:
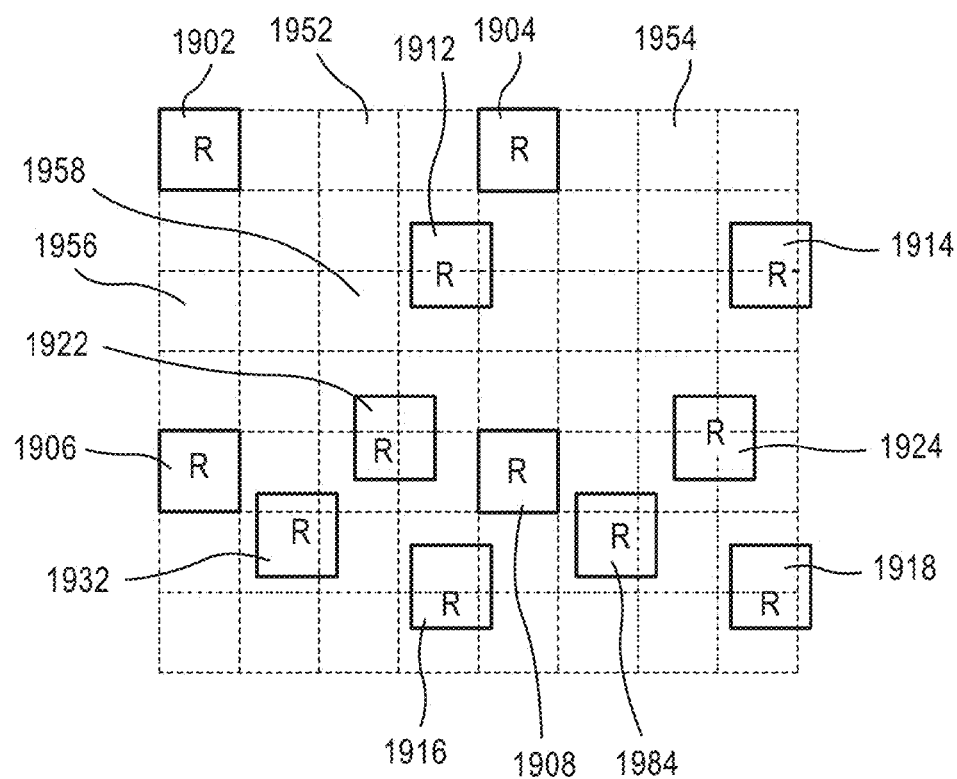
FIG. 20 is conceptual diagram illustrating corrected locations of R pixel values and grid nodes corresponding to the R phase.

However, other methods of interpolation can be used besides the bi-linear interpolation method in the case in which the shifted pixel values do not form a regular grid. In particular, known methods for re-sampling an array of data from an irregularly sampled grid to a regularly sampled grid may be used to generate the corrected pixel values—in the case of a color image sensor 100A-C, this may be done on a color-plane by color-plane basis, while in a monochrome image sensor 100A-C this may be done considering all of the pixel values together. For example, FIG. 19 shows the shifted locations of the R pixel values based on the motion vectors $\overline{\delta s_0}$, $\overline{\delta s_2}$, $\overline{\delta s_8}$, and $\overline{\delta s_{10}}$ from FIG. 17. The locations 1902, 1904, 1906, 1908 correspond to pixels exposed at phase t0, the locations 1912, 1914, 1916, 1918 correspond to pixels exposed at phase t2, the locations 1922, 1924 correspond to pixels exposed at phase t10, and the locations 1932, 1934 correspond to pixels exposed at phase t8. The corrected pixel values at the grid nodes corresponding to the R color plane, such as the nodes 1952, 1954, 1956, 1958, . . . etc., can be obtained by interpolation using the R pixel values at the shifted locations such as 1902, 1904, 1912, 1914, 1906, 1922, . . . etc. Interpolation methods such as nearest neighbor interpolation, sinc interpolation, distance weighted interpolation, frequency domain interpolation, etc., can be used.

The motion-corrected pixel data output from the motion correction circuitry 702 may be fed into the image signal processor 110, where additional image processing procedures such as demosaicing, noise removal, lens artifact removal, sharpening, color correction, etc., are performed. Because the motion-corrected pixel data is in the same raw data format as the input pixel data, the subsequent stage image processing can be performed in the usual manner without any adjustment being required.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. An electronic device comprising:
a motion sensor configured to
detect motion of the electronic device, and
output motion information based on the motion that is detected; and
motion correction circuitry that is separate from the motion sensor, the motion correction circuitry configured to
receive raw domain image data from an image sensor including a block-based analog-to-digital converter architecture and image sensing elements, the raw domain image data being generated by the block-based analog-to-digital converter architecture based on analog pixel signals that are generated from an exposure of the image sensing elements to incident light, and
correct the raw domain image data based on the motion information,
wherein detecting the motion of the electronic device is synchronous with the exposure of the image sensing elements to the incident light.

2. The electronic device of claim 1,
wherein the motion correction circuitry is configured to correct pixel values of the raw domain image data by:
determining uncorrected locations, in a two-dimensional space, of the pixel values based on a data format of the raw domain image data, the uncorrected locations forming a regular grid,
determining a corrected location, in the two-dimensional space, for each of the pixel values based on the pixel values' respective uncorrected locations and the motion information,
generating a corrected pixel value for each node of the regular grid based on the pixel values and their respective corrected locations, and
outputting corrected pixel values as a motion-corrected frame in the data format of the raw domain image data.

3. The electronic device of claim 2,
wherein the motion correction circuitry is configured to generate a given one of the corrected pixel values by performing an interpolation utilizing at least one of the pixel values and a corresponding corrected location.

4. The electronic device of claim 2,
wherein the motion correction circuitry is configured to generate a given one of the corrected pixel values by performing bi-linear interpolation utilizing four of the pixel values and their respective corrected locations.

5. An electronic device comprising:
a motion sensor configured to detect motion of the electronic device and output motion information based on the detected motion; and
motion correction circuitry configured to correct raw domain image data, received from an image sensor that has a block-based analog-to-digital converter architecture, based on the motion information,
wherein the motion correction circuitry is configured to correct pixel values of the raw domain image data by:
determining uncorrected locations, in a two-dimensional space, of the pixel values based on a data format of the raw domain image data, the uncorrected locations forming a regular grid,
determining a corrected location, in the two-dimensional space, for each of the pixel values based on the pixel values' respective uncorrected locations and the motion information,
generating a corrected pixel value for each node of the regular grid based on the pixel values and their respective corrected locations, and
outputting corrected pixel values as a motion-corrected frame in the data format of the raw domain image data,
wherein the motion correction circuitry is configured to generate a given one of the corrected pixel values by performing bi-linear interpolation utilizing four of the pixel values and their respective corrected locations, and
wherein each of the pixel values in the raw domain image data corresponds to one of a plurality of colors according to a color pattern associated with the data format of the raw domain image data,
each of the corrected pixel values in the motion-corrected frame corresponds to one of the plurality of colors according to the color pattern, and
the four of the pixel values that are utilized by the motion correction circuitry in the bi-linear interpolation for the given one of the corrected pixel values correspond to a same one of the plurality of colors that the given one of the corrected pixel values corresponds to.

6. An electronic device comprising:
a motion sensor configured to detect motion of the electronic device and output motion information based on the detected motion; and
motion correction circuitry configured to correct raw domain image data, received from an image sensor that has a block-based analog-to-digital converter architecture, based on the motion information,
wherein the motion correction circuitry is configured to correct pixel values of the raw domain image data by:
determining uncorrected locations, in a two-dimensional space, of the pixel values based on a data format of the raw domain image data, the uncorrected locations forming a regular grid, determining a corrected location, in the two-dimensional space, for each of the pixel values based on the pixel values' respective uncorrected locations and the motion information,
generating a corrected pixel value for each node of the regular grid based on the pixel values and their respective corrected locations, and
outputting corrected pixel values as a motion-corrected frame in the data format of the raw domain image data, and
wherein the block-based analog-to-digital converter architecture includes having a plurality of blocks that each include N light sensing elements that share an analog-to-digital converter, N>1, the N light sensing elements in each block being exposed sequentially in N exposure phases per frame period,
each of the pixel values corresponds to one of the exposure phases,
the motion sensor is configured to output the motion information as motion vectors that each correspond to one of the exposure phases,
the motion correction circuitry is configured to determine the corrected location of each of the pixel values based on the one of the motion vectors that corresponds to the one of the exposure phases to which the respective one of the pixel values corresponds.

7. The electronic device of claim 6,
wherein N=4,
each of the pixel values in the raw domain image data corresponds to one of four colors according to a color pattern associated with the data format of the raw domain image data,
each of the corrected pixel values in the motion-corrected frame corresponds to one of the four colors according to the color pattern, and
each of the phases corresponds to one of the four colors.

8. The electronic device of claim 7,
wherein the motion correction circuitry is configured to generate a given one of the corrected pixel values by performing bi-linear interpolation utilizing four of the pixel values and their respective corrected locations, the four of the pixel values corresponding to a same one of the four colors that the given one of the corrected pixel values corresponds to.

9. The electronic device of claim 6,
wherein each of the pixel values in the raw domain image data corresponds to one of a plurality of colors according to a color pattern associated with the data format of the raw domain image data,
each of the corrected pixel values in the motion-corrected frame corresponds to one of the plurality of colors according to the color pattern, and
each of the phases corresponds to one of the plurality of colors
the motion correction circuitry is configured to generate each of the corrected pixel values by performing interpolations, each of the interpolations utilizing only ones of the pixel values that correspond to a same one of the plurality of colors that the one of the corrected pixel values that is being generated corresponds to.

10. An image sensing device, comprising:
an image sensor including
image sensing elements configured to generate analog pixel signals from an exposure to incident light, and
a block-based analog-to-digital converter architecture configured to generate raw domain image data based on the analog pixel signals;
a motion sensor that is separate from the image sensor, the motion sensor configured to
detect motion of the image sensing device, and
output motion information based on the motion that is detected; and
motion correction circuitry configured to
receive the raw domain image data from the image sensor, and
correct the raw domain image data based on the motion information,
wherein detecting the motion of the image sensing device is synchronous with the exposure of the image sensing elements to the incident light.

11. The image sensing device of claim 10,
wherein the motion correction circuitry is configured to correct pixel values of the raw domain image data by:
determining uncorrected locations, in a two-dimensional space, of the pixel values based on a data format of the raw domain image data, the uncorrected locations forming a regular grid,
determining a corrected location, in the two-dimensional space, for each of the pixel values based on the pixel values' respective uncorrected locations and the motion information,
generating a corrected pixel value for each node of the regular grid based on the pixel values and their respective corrected locations, and
outputting corrected pixel values as a motion-corrected frame in the data format of the raw domain image data.

12. The image sensing device of claim 11,
wherein the motion correction circuitry is configured to generate a given one of the corrected pixel values by performing an interpolation utilizing at least one of the pixel values and its corrected location.

13. The image sensing device of claim 11,
wherein the motion correction circuitry is configured to generate a given one of the corrected pixel values by performing bi-linear interpolation utilizing four of the pixel values and their respective corrected locations.

14. An image sensing device, comprising:
an image sensor that has a block-based analog-to-digital converter architecture;
a motion sensor configured to detect motion of the image sensing device and output motion information based on the detected motion; and
motion correction circuitry configured to correct raw domain image data, received from the image sensor, based on the motion information,
wherein the motion correction circuitry is configured to correct pixel values of the raw domain image data by:
determining uncorrected locations, in a two-dimensional space, of the pixel values based on a data format of the raw domain image data, the uncorrected locations forming a regular grid,
determining a corrected location, in the two-dimensional space, for each of the pixel values based on the pixel values' respective uncorrected locations and the motion information,
generating a corrected pixel value for each node of the regular grid based on the pixel values and their respective corrected locations, and
outputting corrected pixel values as a motion-corrected frame in the data format of the raw domain image data,
wherein the motion correction circuitry is configured to generate a given one of the corrected pixel values by performing bi-linear interpolation utilizing four of the pixel values and their respective corrected locations, and wherein each of the pixel values in the raw domain image data corresponds to one of a plurality of colors according to a color pattern associated with the data format of the raw domain image data, each of the corrected pixel values in the motion-corrected frame corresponds to one of the plurality of colors according to the color pattern, and the four of the pixel values that are utilized by the motion correction circuitry in the bi-linear interpolation for the given one of the corrected pixel values correspond to a same one of the plurality of colors that the given one of the corrected pixel values corresponds to.

15. An image sensing device, comprising:

an image sensor that has a block-based analog-to-digital converter architecture;

a motion sensor configured to detect motion of the image sensing device and output motion information based on the detected motion; and motion correction circuitry configured to correct raw domain image data, received from the image sensor, based on the motion information, wherein the motion correction circuitry is configured to correct pixel values of the raw domain image data by:
  determining uncorrected locations, in a two-dimensional space, of the pixel values based on a data format of the raw domain image data, the uncorrected locations forming a regular grid,
  determining a corrected location, in the two-dimensional space, for each of the pixel values based on the pixel values' respective uncorrected locations and the motion information,
  generating a corrected pixel value for each node of the regular grid based on the pixel values and their respective corrected locations, and
  outputting corrected pixel values as a motion-corrected frame in the data format of the raw domain image data, and wherein the block-based analog-to-digital converter architecture includes having a plurality of blocks that each include N light sensing elements that share an analog-to-digital converter, N>1, the N light sensing elements in each block being exposed sequentially in N exposure phases per frame period, each of the pixel values corresponds to one of the exposure phases, the motion sensor is configured to output the motion information as motion vectors that each correspond to one of the exposure phases, the motion correction circuitry is configured to determine the corrected location of each of the pixel values based on the one of the motion vectors that corresponds to the one of the exposure phases to which the respective one of the pixel values corresponds.

16. The image sensing device of claim 15,
wherein N=4,
each of the pixel values in the raw domain image data corresponds to one of four colors according to a color pattern associated with the data format of the raw domain image data,
each of the corrected pixel values in the motion-corrected frame corresponds to one of the four colors according to the color pattern, and
each of the phases corresponds to one of the four colors.

17. The image sensing device of claim 16,
wherein the motion correction circuitry is configured to generate a given one of the corrected pixel values by performing bi-linear interpolation utilizing four of the pixel values and their respective corrected locations, the four of the pixel values corresponding to a same one of the four colors that the given one of the corrected pixel values corresponds to.

18. The image sensing device of claim 15,
wherein each of the pixel values in the raw domain image data corresponds to one of a plurality of colors according to a color pattern associated with the data format of the raw domain image data,
each of the corrected pixel values in the motion-corrected frame corresponds to one of the plurality of colors according to the color pattern, and
each of the phases corresponds to one of the plurality of colors
the motion correction circuitry is configured to generate each of the corrected pixel values by performing interpolations, each of the interpolations utilizing only ones of the pixel values that correspond to a same one of the plurality of colors that the one of the corrected pixel values that is being generated corresponds to.

19. The image sensing device of claim 10,
wherein the image sensor is part of a same circuit package as at least one of the motion sensor or the motion correction circuitry.

20. The image sensing device of claim 10,
wherein the image sensor is part of a different circuit package than at least one of the motion sensor or the motion correction circuitry.

21. An electronic apparatus comprising:
the imaging sensing device of claim 10, and
an image signal processor configured to execute predetermined signal processing on motion-corrected raw domain image data output by the motion correction circuitry.

22. The electronic apparatus of claim 21,
wherein the image signal processor is part of a same circuit package as at least one of the image sensor, the motion sensor, or the motion correction circuitry.

23. The image sensing device of claim 10, further comprising:
an image signal processor,
wherein the image signal processor is part of a different circuit package than at least one of the image sensor, the motion sensor, or the motion correction circuitry.

24. A method of controlling a motion correction device, the method comprising:
detecting, with a motion sensor, motion of the motion correction device;
generating motion information based on the motion that is detected by the motion sensor;
receiving, with a motion correction circuitry, raw domain image data from an image sensor including a block-based analog-to-digital converter architecture and image sensing elements, the raw domain image data being generated by the block-based analog-to-digital converter architecture based on analog pixel signals that are generated from an exposure of the image sensing elements to incident light; and
correcting the raw domain image data based on the motion information,
wherein detecting the motion of the motion correction device is synchronous with the exposure of the image sensing elements to the incident light.

25. The method of claim 24, further comprising:
causing the motion correction device to correct pixel values of the raw domain image data by:
- determining uncorrected locations, in a two-dimensional space, of the pixel values based on a data format of the raw domain image data, the uncorrected locations forming a regular grid,
- determining a corrected location, in the two-dimensional space, for each of the pixel values based on the pixel values' respective uncorrected locations and the motion information, and
- generating a corrected pixel value for each node of the regular grid based on the pixel values and their respective corrected locations.

26. The method of claim 25, further comprising:
outputting the corrected pixel values as a motion-corrected frame in the data format of the raw domain image data.

27. A non-transitory computer readable medium storing program code executable by a processor of a motion correction device to cause the processor to perform a set of operations comprising:
- controlling a motion sensor to detect motion of the motion correction device;
- generating motion information based on the motion that is detected by the motion sensor;
- receiving raw domain image data from an image sensor that is separate from the motion sensor, the image sensor including a block-based analog-to-digital converter architecture and image sensing elements, the raw domain image data being generated by the block-based analog-to-digital converter architecture based on analog pixel signals that are generated from an exposure of the image sensing elements to incident light; and
- correcting the raw domain image data based on the motion information,
- wherein the motion of the motion correction device that is detected by the motion sensor is synchronous with the exposure of the image sensing elements to the incident light.

28. The non-transitory computer readable medium of claim 27, wherein the set of operations further includes
causing the motion correction device to correct pixel values of the raw domain image data by:
- determining uncorrected locations, in a two-dimensional space, of the pixel values based on a data format of the raw domain image data, the uncorrected locations forming a regular grid,
- determining a corrected location, in the two-dimensional space, for each of the pixel values based on the pixel values' respective uncorrected locations and the motion information, and
- generating a corrected pixel value for each node of the regular grid based on the pixel values and their respective corrected locations.

29. The non-transitory computer readable medium of claim 28, wherein the set of operations further includes
outputting the corrected pixel values as a motion-corrected frame in the data format of the raw domain image data.

* * * * *